United States Patent [19]
Klapdor et al.

[11] Patent Number: 5,951,739
[45] Date of Patent: *Sep. 14, 1999

[54] PROCESS FOR PREPARING X-RAY AMORPHOUS AND NANOCRYSTALLINE METAL POWDERS

[75] Inventors: Astrid Klapdor; Wilfried Knott; Dagmar Windbiel, all of Essen, Germany

[73] Assignee: Th. Goldschmidt AG, Essen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/613,841

[22] Filed: Mar. 11, 1996

[30] Foreign Application Priority Data

May 26, 1995 [DE] Germany ............................ 195 19 360

[51] Int. Cl.$^6$ ...................................................... B22F 9/24
[52] U.S. Cl. ................................. 75/371; 75/373; 75/374
[58] Field of Search ............................. 75/370, 371, 373, 75/374; 423/497

[56] References Cited

U.S. PATENT DOCUMENTS

| | | | |
|---|---|---|---|
| 4,554,153 | 11/1985 | Bogdanovic | 423/647 |
| 4,832,934 | 5/1989 | Bogdanovic et al. | 423/497 |
| 4,957,727 | 9/1990 | Bogdanovic | 423/647 |
| 5,385,716 | 1/1995 | Bogdanovic et al. | 75/370 |

FOREIGN PATENT DOCUMENTS

| | | |
|---|---|---|
| 0 003 564 | 8/1979 | European Pat. Off. . |
| 299352 | 1/1989 | European Pat. Off. . |
| 0 423 627 A1 | 4/1991 | European Pat. Off. . |
| 0 490 156 B1 | 6/1992 | European Pat. Off. . |
| 0 685 425 A1 | 12/1995 | European Pat. Off. . |
| 3541633 | 5/1987 | Germany . |
| 3621624 | 1/1988 | Germany . |
| 3722993 A1 | 1/1989 | Germany . |
| 4024205 | 2/1992 | Germany . |
| 63-312905 | 12/1988 | Japan ........................................ 75/370 |
| 90-07012 | 6/1990 | WIPO . |

OTHER PUBLICATIONS

Bogdonovic, B., et al., "Katalytische Synthese von Magnesiumhydrid under milder Bedingungen," *Angew. Chem.* 92, 1980, pp. 845–846, and English translation.

Periodic Table appearing in *Inorganic Chemistry*, Purcell, K., et al., W.B. Sanders Company, 1977.

Ibl, N., "Electrolytische Metallpulver," *Chemie–Ing. Techn.*, v. 36, pp. 601–612, 1964.

Trozzolo, Anthony M., ed., Chemical Reviews, v. 82, pp. 153–207, 1982.

Kavaliunas, Arunas V. et al., "Preparation of Highly Reactive Metal Powders . . . Microparticles," *Organometallics*. v. 2, No. 3, pp. 377–383, 1983.

van Wenterghen, J. et al., "Formation of ultra–fine amorphous . . . solution," *Nature*, v. 322, pp. 622–623, Aug. 14, 1986.

Koerner, G. et al., "Neue Synthesen von Magnesiumhydrid," *Z. Naturforsch*, 47b, pp. 767–771, 1992.

Greenwood, N. et al., *Chemistry of the Elements*, pp. 190–191.

*Primary Examiner*—George Wyszomierski
*Attorney, Agent, or Firm*—Scully, Scott, Murphy & Presser

[57] ABSTRACT

X-ray amorphous and nanocrystalline elemental metal powders of groups IB to VIIIB of the Periodic Table are prepared by reacting halides of these metals with alkali metal hydrides or alkaline earth metal hydrides in an organic solvent with continual milling.

2 Claims, 8 Drawing Sheets

200 nm 200 nm

PROCESS FOR PREPARING X-RAY AMORPHOUS AND NANOCRYSTALLINE METAL POWDERS

BACKGROUND OF THE INVENTION

The invention relates to a process for preparing X-ray amorphous and nanocrystalline metal powders of groups IB to VIIIB of the Periodic Table.

Relatively new methods for preparing very fine metal particles comprise metal vaporization (S. C. Davis and K. J. Klabunde, Chem. Rev. 1982, 82, 153–208), electrolytic processes (N. Ibl, Chem. Ing.-Techn. 1964, 36, 601–609) and the reduction of metal halides with alkali metals (R. D. Rieke, Organometallics, 1983, 2, 377) or anthracene-activated magnesium (DE 35 41 633). Also known is the reduction of metal salts with alkali metal borohydrides in aqueous medium to give metal borides (N. N. Greenwood, A. Earnshaw, Chemistry of the Elements, Pergamon Press 1986, p. 190). The coreduction of iron and cobalt salts in water leads to an Fe/Co/B-alloy having the composition $Fe_{44}Co_{19}B_{37}$ (J. v. Wonterghem, St. Morup, C. J. W. Koch, St. W. Charles, St. Wells, Nature, 1986, 322, 622).

Sodium borohydride is likewise the reducing agent in producing heat-resistant, amorphous ferromagnetic powders according to DE-A 36 21 624, with salts of iron, cobalt, nickel and chromium being reduced in sodium hydroxide solution in the presence of complexing agents and xylene being added as oxidation-inhibiting phase.

DE-A 40 24 205 teaches a process for preparing metal-magnesium compounds and their use for preparing finely divided, possibly amorphous metal and alloy powders or intermetallic compounds by a non-metallurgical, i.e. wet chemical, route under mild conditions, with the metal-magnesium alloys being obtainable by reacting metal halides of the metals of groups IIIA-VA, VB-VIIB, VIIIB, IB and IIB of the Periodic Table ($M^1X_m$) or metals $M^1$ or $M^1$ hydrides with magnesium hydride ($MgH_2$), hydridomagnesium halides (HMgX), organomagnesium compounds and/or metallic magnesium in an organic solvent, in the presence or absence of anthracene or its derivatives, magnesium halides, organic halides and/or quinuclidine as activators. The $MgH_2$ used here is a particularly active magnesium hydride containing complex catalysts ($MgH_2^*$ according to EP-B 0 003 564 or $MgH_2'$ according to DE-C 37 22 993). Stoichiometric reaction of the metal-magnesium compounds with the corresponding metal halides gives amorphous metal powders.

WO 90/07012 is concerned with a process for preparing a metal, an alloy or a ceramic, in which the metal compound to be reduced is subjected to mechanical activation either alone or in the presence of at least one reducing agent. For the mechanical activation, preference is given to using high-energy milling which leads not only to the particle size reduction usual in milling processes but also to a welding together of the powder particles. Bearing in mind the extreme energy consumption, the material wear associated therewith and the usually very long reaction times (mostly more than 24 hours), this process does not provide an economical solution to the production of fine metal powders.

EP-A-0 423 627 teaches a process for preparing finely divided, microcrystalline to amorphous metal or alloy powders and colloidal metals or alloys in organic solvents, in which metal salts, either individually or as a mixture, are reacted in inert organic solvents with alkali metal hydrides or alkaline earth metal hydrides which are kept in solution in the organic medium by means of organoboron or organogallium complexing agents, or with tetraalkylammonium triorganohydridoborate. The process claimed is expensive due to the use of elaborate boron or gallium complexes and in addition frequently gives metal powders having not inconsiderable boron contents.

SUMMARY OF THE INVENTION

It is an object of the present invention to solve the industrial problem of developing a process for preparing industrially important X-ray amorphous or nanocrystalline metal powders on the basis of simple, commercially available metal hydrides, which process dispenses with both the complex activators and complexing agents mentioned in the prior art and expensive activation techniques and yet leads to the desired products.

Ultrafine metal powders having a particle size in the nanometer range provide a route to extremely thin metal layers and to metallic pastes in the field of microelectronics. They are also of interest for producing magnetic recording media since in nanocrystalline metals each individual crystallite has its own magnetic orientation. Nanocrystalline metals can be used as sintering aids and also serve as base material for producing capacitors and sensors. A further important application of very fine metals are the pseudoalloys derived from amorphous metals, which allow production of systems which cannot be obtained by melt-metallurgical routes. These solids, also referred to as magnetic glasses, are characterized by high hardness with at the same time good deformability and a striking soft magnetic behavior. The area of heterogeneous catalysis offers a wide field of application for nanocrystalline metals, particularly when the metals are fixed on suitable support materials.

The problem posed is solved by a process for preparing amorphous and nanocrystalline metal powders of groups IB to VIIIB of the Periodic Table, by reacting halides of these metals with alkali metal or alkaline earth metal hydrides in an organic solvent with continual milling.

Alkali metal hydrides or alkaline earth metal hydrides such as lithium hydride, sodium hydride, potassium hydride and calcium hydride are industrially available and, from the economic standpoint, of interest for preparing finely divided metal powders. If safety on handling is included in the considerations as a selection feature, magnesium hydride has for some time attracted particular attention.

The hydride used is preferably a magnesium hydride which is prepared by adding, in the first hydrogenation, magnesium hydride as catalyst to the magnesium to be hydrogenated and carrying out the hydrogenation with continual stirring of the reaction mixture.

A particularly suitable magnesium hydride is one which is obtained autocatalytically at high temperatures from the elements by adding, in the first hydrogenation, magnesium hydride having a particle size of $\leq 400\,\mu m$ as catalyst to the finely divided magnesium to be hydrogenated in an amount of at least 1.2% by weight, based on magnesium to be hydrogenated, and carrying out the hydrogenation at a temperature of $\geq 250°$ C. and a pressure of from 0.5 to 5 MPa with continual stirring of the reaction mixture (EP-B-0 490 156).

Another particularly suitable magnesium hydride is one which is prepared by adding, in the first hydrogenation, finely divided, highly reactive magnesium as catalyst to the magnesium to be hydrogenated and carrying out the hydrogenation with continual stirring of the reaction mixture, with the hydrogenation preferably being carried out at a temperature of $\geq 250°$ C. and a pressure of from 0.5 to 5 MPa with continual stirring of the reaction mixture (EP-A-0 685 425).

These magnesium hydrides are distinguished by a very high degree of safety on handling, since they are non-pyrophoric and even on contact with mineral acids do not tend to ignite (G. Koerner, K.-D. Klein and W. Knott, Z. Naturforsch. 47b, 767 (1992)).

The milling or tribochemical activation of the magnesium hydride prepared from the elements by means of autocatalysis at high temperatures performs, astonishingly for those skilled in the art, a number of important functions in the reduction reaction. This relatively inert magnesium hydride acquires in situ a reducing power which is otherwise only associated with those known forms of MgH$_2$ whose synthesis is carried out in organic solvents at significantly lower temperatures using complex catalysts.

The industrial implementation of the process of the invention is ensured not least by safe handleability of the non-pyrophoric autocatalytically produced magnesium hydride.

A further effect typical of the process results from the milling energy introduced which produces a great dispersivity of the reduced metal, with this being achieved without the stabilizing influence of complexing agents.

The preparation of the nanocrystalline or X-ray amorphous metals of the invention is carried out in a simple manner by stoichiometric reaction of the alkali metal hydrides (M$^I$H) or alkaline earth metal hydrides (M$^{II}$H$_2$) with the corresponding metal halides in accordance with the equations $$^TMX_n + nM^IH \rightarrow {}^TM^O + nM^IX + n/2H_2$$

$$^TMX_n + n/2M^{II}H_2 \rightarrow {}^TM^O + n/2M^{II}X_2 + n/2H_2$$

where $^TMX_n$ is a transition metal halide of groups IB, IVB and VIIIB of the Periodic Table of the Elements.

The separation and work-up of the amorphous or nanocrystalline powders prepared by the process of the invention is particularly elegant and simple in the case of the ferromagnetic metals, since these can be, for example, deposited on magnetic immersed fingers and washed free of adhering salts. The purification of the nonmagnetic metal powders such as titanium is possible in an advantageous manner by extraction of the magnesium halides which are readily soluble in numerous solvents. Other metals obtained by the process claimed, for example tantalum, can be isolated in correspondingly pure form by the combination of leaching and washing steps. By variation of the metal halides used, the process presented here provides an elegant route to nanocrystalline intermetallic phases.

Suitable solvents are customary ethers for the reduction of those metal halides whose Lewis acidity does not lead to undesired secondary reactions with the ether. Halides having an extremely high Lewis acidity, for example tantalum(V) chloride or tungsten(VI) chloride, are therefore not suitable for reaction in ethers, but can be reduced to the finely divided metals, for example, in alkanes, aromatics or alkylaromatics such as toluene. In selecting an ether solvent, preference is given to using tetrahydrofuran.

It can be seen from the above that suitable solvents are only those which are inert toward the reactants, i.e. no reduction, dissociation or polymerization reactions should take place under the action of the hydrides or metal halides used.

DETAILED DESCRIPTION OF THE PREFERRED EMBODIMENTS

Example 1

19.1 g (0.118 mol) of anhydrous iron(III) chloride FeCl$_3$ and 5.1 g (0.177 mol) of magnesium hydride (autocatalytically prepared MgH$_2$, hydride content 92%) are placed in a 500 ml laboratory ball mill and milled, and 250 ml of absolute tetrahydrofuran are then introduced. The addition of the ether leads to spontaneous evolution of hydrogen. A downstream gas burette allows the volumetric determination of H$_2$ during the reduction of the halide to the metal and thus gives information on the conversion achieved. After only 5 minutes of milling, the reaction mixture has reached a conversion of 31% with significant evolution of heat (temperature rise to 50° C.). The reaction progress achieved is made visible not least by the associated color change (yellowish green to green).

After the initial exothermic phase has abated, the reaction mixture is heated with further continual milling to the reflux temperature; after about one hour the expected volume of hydrogen has been liberated and the reaction is completed.

The mixture is allowed to cool under a stream of argon and the reaction mixture is transferred to a receiver flask and the ball mill is rinsed with small portions of fresh tetrahydrofuran to avoid losses. The receiver flask is provided with a magnetic immersed finger on whose surface metallic iron deposits. After removing the salt-laden solvent and continued washing with small amounts of fresh THF, an iron powder which is initially still moist with ether is obtained.

Complexometric analysis of the combined THF phases allows a mass balance of the reaction with regard to the residual content of salts in the raw product. Continued extraction with THF in a Soxhlet apparatus allows the isolation of pure iron which is dried in an oil pump vacuum. Yield: 5.1 g (77% of theory).

Figure 1A:
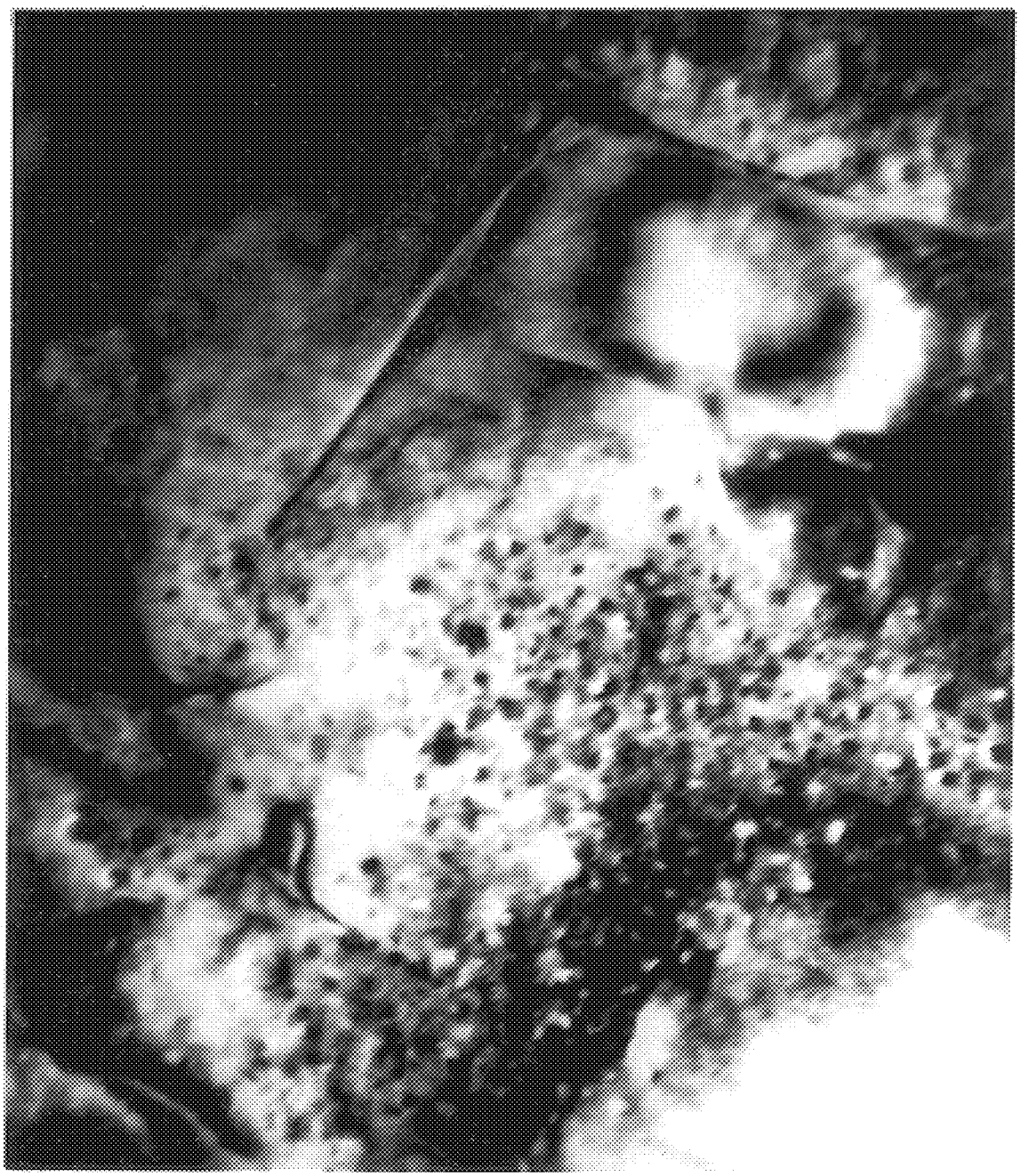
FIGS. 1a and 1b show transmission electron micrographs (TEM) of iron powder produced according to the invention.
Figure 1B:

TEM studies (transmission electron microscopy, bright field and dark field micrographs in FIGS. 1a and 1b) on the pyrophoric iron powder obtained show mean crystallite sizes of 28±5 nm.

Example 2

Using a method similar to Example 1, 5.8 g (0.2 mol) of autocatalytically prepared magnesium hydride (hydride content 91%) are milled with 25.9 g (0.2 mol) of anhydrous nickel chloride NiCl$_2$ in a 500 ml laboratory ball mill and then admixed with cooled absolute tetrahydrofuran. The mixture is, with further continual milling, heated to the reflux temperature, with a conversion of about 30% being measured at this stage by means of the gas volume. The further reaction takes 6.5 hours and achieves a conversion of 85%. After the reaction is complete, nickel is deposited on a magnetic immersed finger using a method similar to Example 1 and is then freed of adhering salts by continued washing with previously degassed, argon-saturated water. Further washing with absolute tetrahydrofuran and subsequent drying in an oil pump vacuum gives 8.0 g of pyrophoric nickel powder.

Figure 2A:
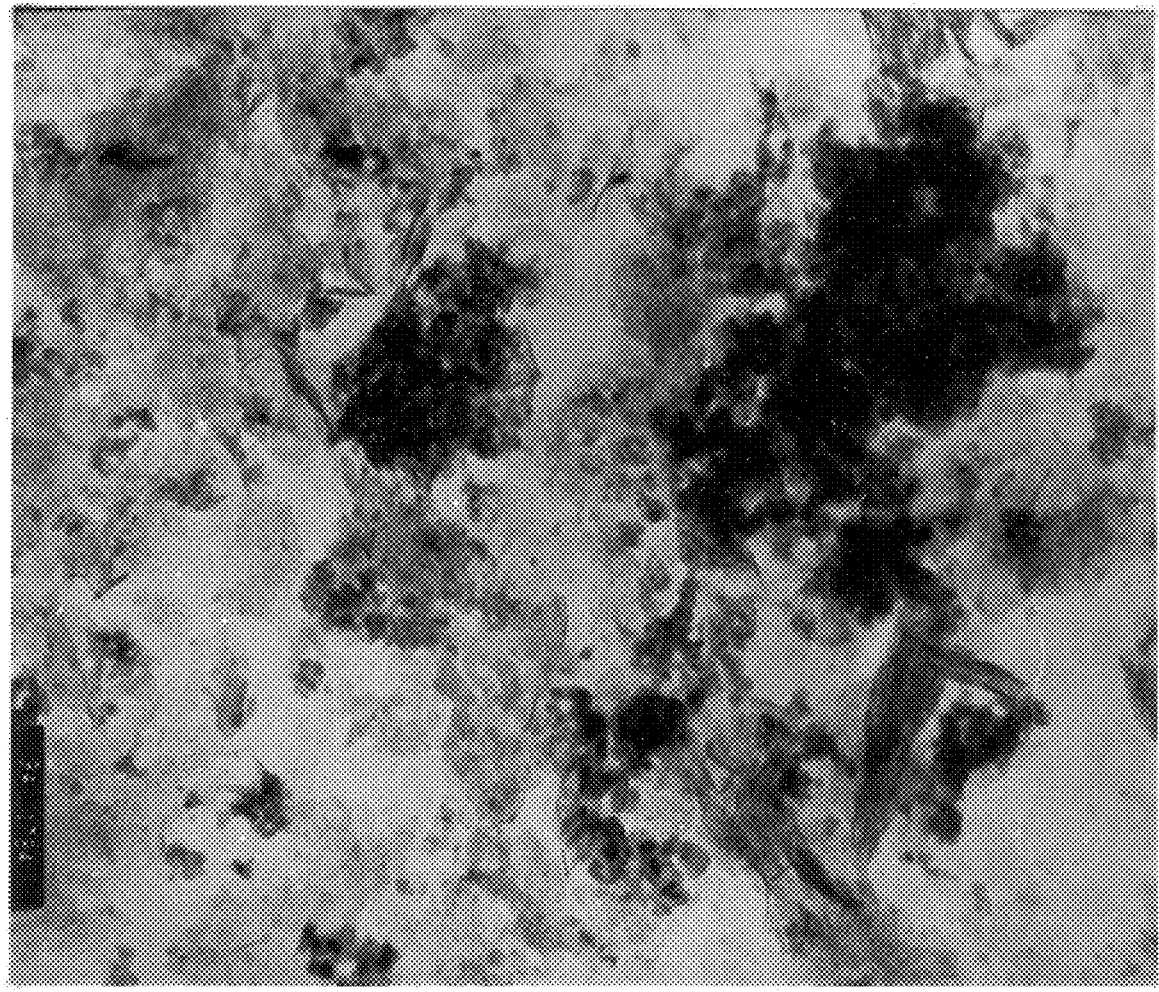
FIGS. 2a and 2b show TEMs of nickel powder produced according to the invention.
Figure 2B:
Figure 3A:
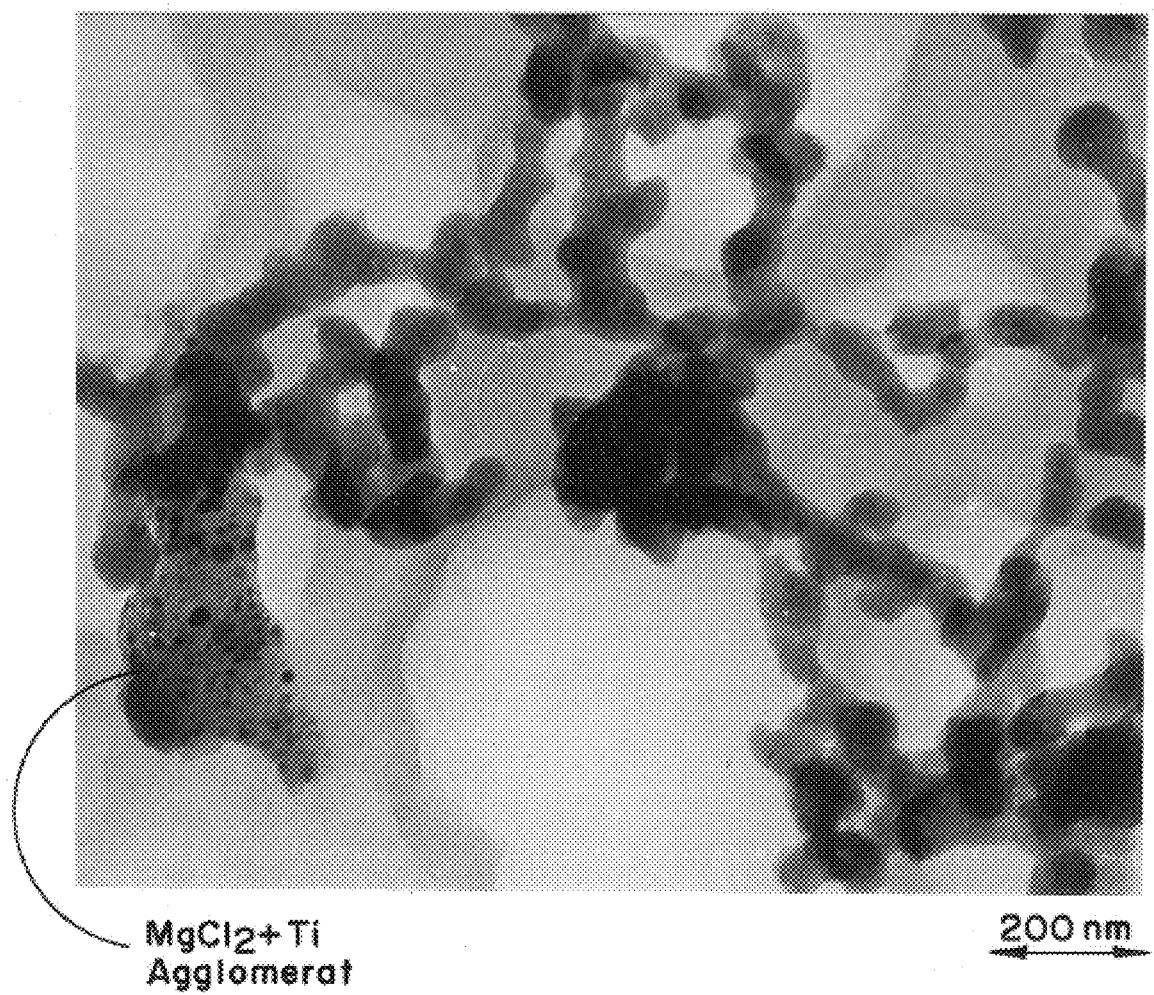
FIGS. 3a and 3b show TEMs of titanium powder which still contains halide.
Figure 3B:
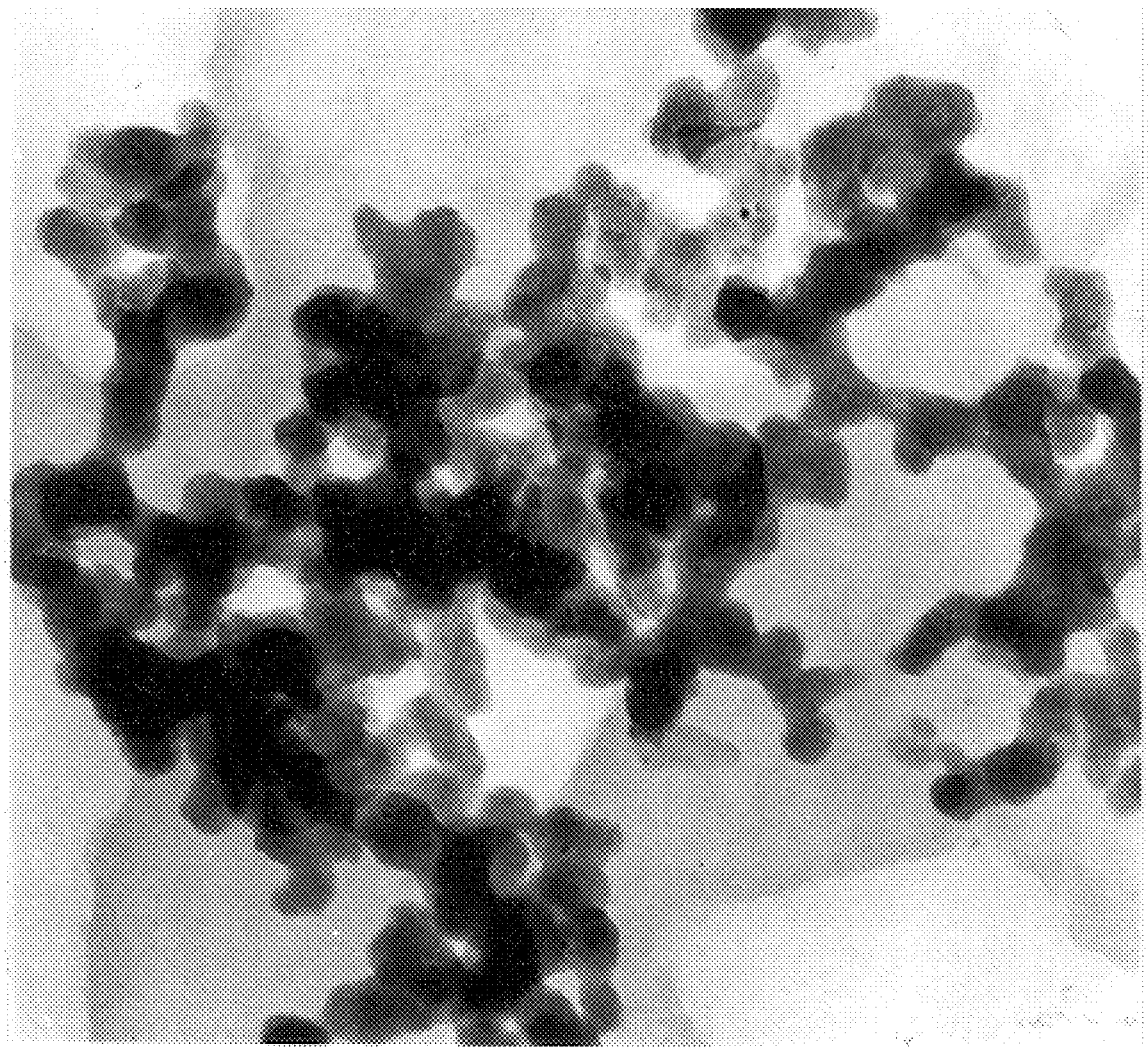
Figure 3C:
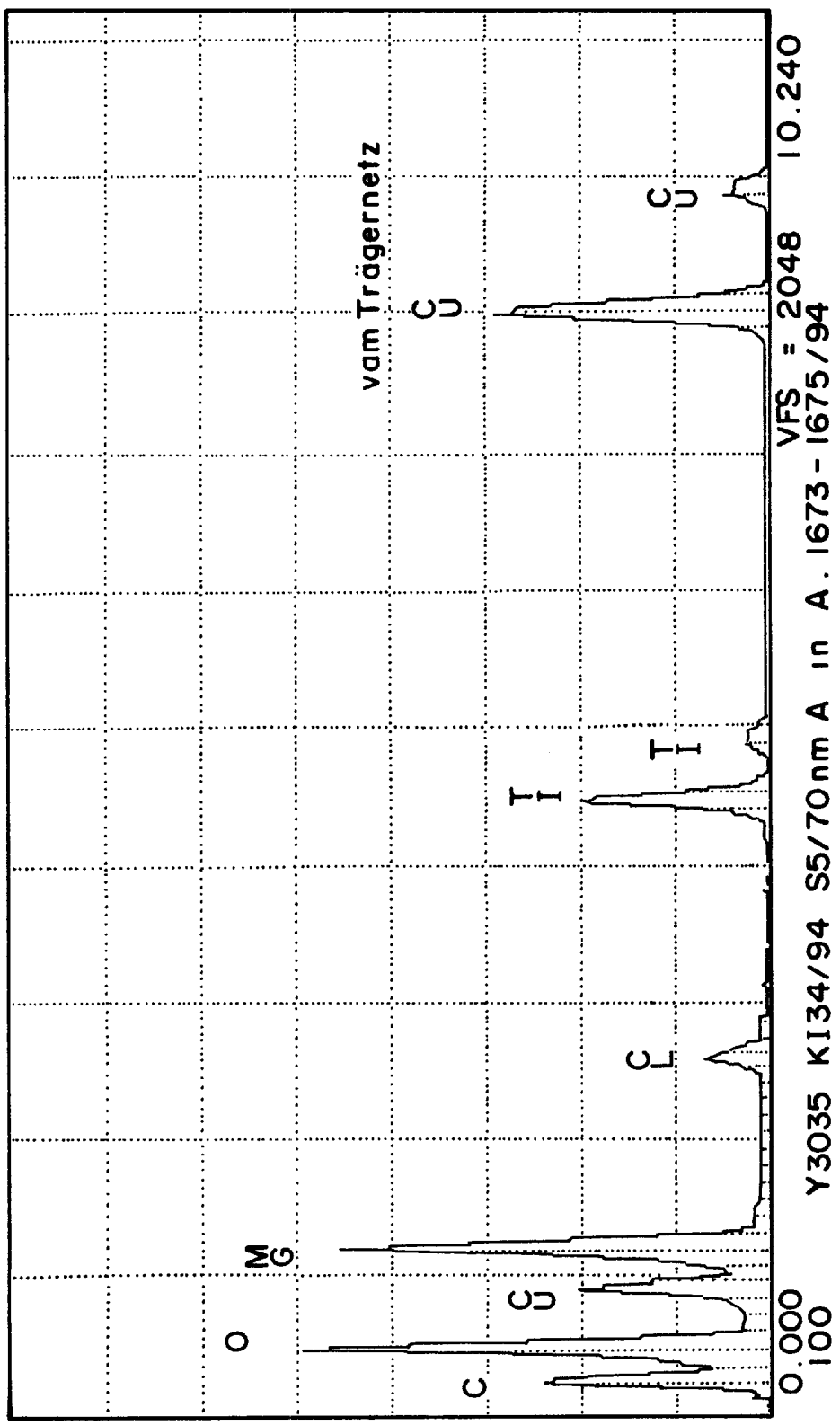
FIGS. 3c and 3d show energy dispersive X-ray (EDX) analysis of such powder.
Figure 3D:
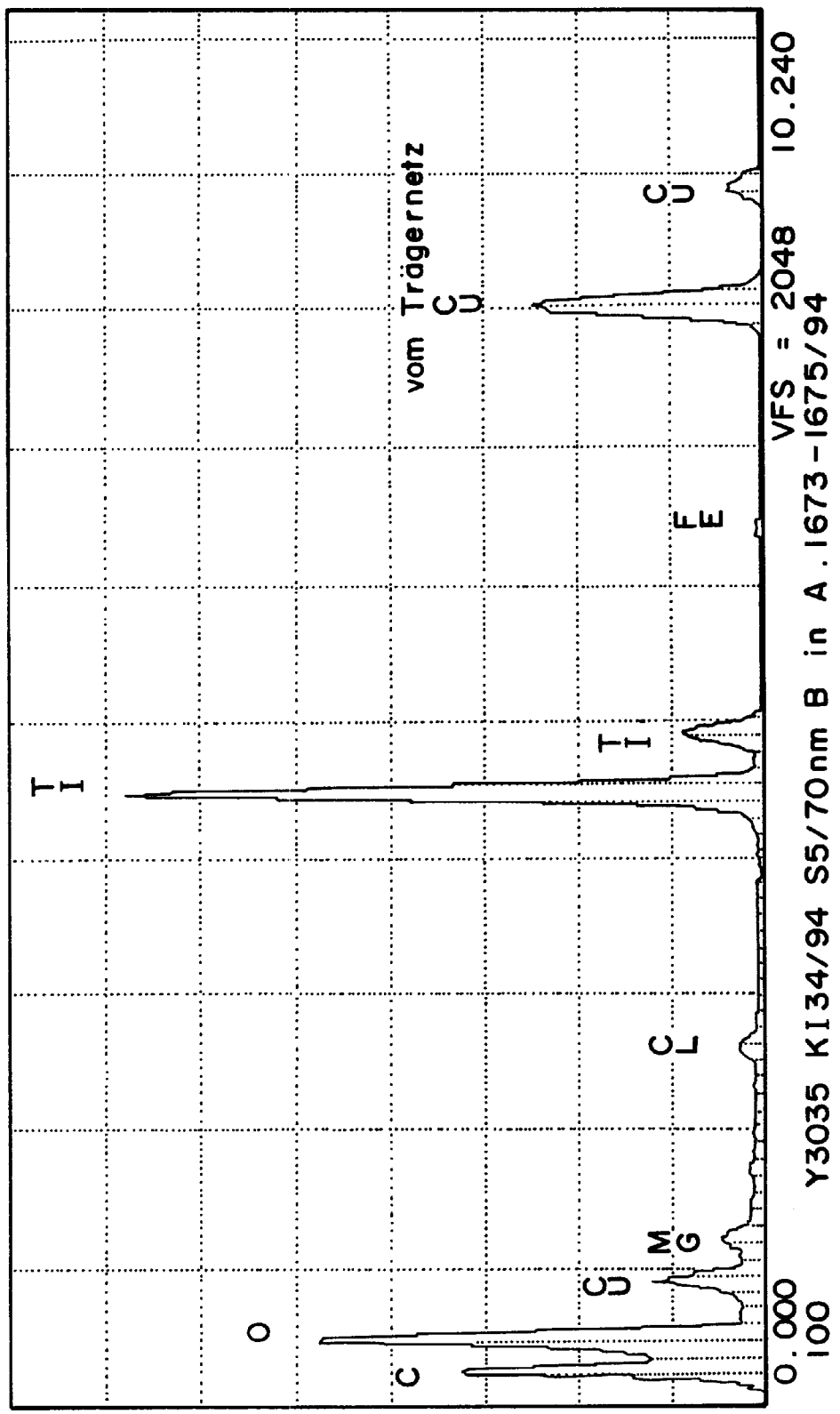

The associated TEM bright field and dark field micrographs are shown in FIGS. 2a and 2b. Particle size determination by means of X-ray diffraction (line broadening of the characteristic reflections) gives a mean crystallite size of 9±0.5 nm for the Ni powder. An EDX analysis (energy dispersive X-ray spectroscopy) coupled with the TEM studies shows that traces of MgO are still present in addition to nickel.

Example 3

Using a method similar to Example 1, 25.96 g (0.2 mol) of anhydrous cobalt(II) chloride and 5.98 g (0.2 mol) of autocatalytically prepared magnesium hydride (91% hydride content) are milled in a laboratory ball mill and admixed with 250 ml of absolute tetrahydrofuran. The reaction mixture is, with further continual milling, heated for 6 hours at the reflux temperature, with the amount of hydrogen liberated corresponding to virtually complete reaction.

After cooling the reaction mixture, cobalt is separated off magnetically using a method similar to Example 2 and is freed of adhering salts by successive washing.

Yield: 11.1 g (94% of theory) of a strongly pyrophoric, X-ray amorphous cobalt powder.

Example 4

7.8 g (0.271 mol) of 91%-pure, autocatalytically prepared magnesium hydride are placed in a 500 ml laboratory ball mill and milled, and admixed with cooled tetrahydrofuran (−70° C.). 25.7 g (0.135 mol) of titanium(IV) chloride $TiCl_4$ are slowly added. After addition is complete, the mixture is, with further continual milling, heated to the reflux temperature. Apart from the hydrogen evolution to be recorded, the reaction can readily be followed visually, since the reduction stages of the titanium can be recognized by their color.

The reaction is complete after one hour and the mixture is cooled under a stream of argon. The reaction mixture is transferred to a P-5 glass frit and the ball mill is rinsed a number of times with small portions of THF. The major part of the magnesium chloride can be very easily removed by extraction with THF (e.g. in a Soxhlet extractor).

TEM micrographs and EDX spectra (energy dispersive X-ray analysis) of the titanium powder still containing halide are shown in FIGS. 3a to 3d. The mean particle size is between 50 and 60 nm.

If desired, further extraction gives a halide-free, highly pyrophoric titanium.

Example 5

17.7 g (0.18 mol) of anhydrous copper(I) chloride CuCl and 2.47 g (0.09 mol) of autocatalytically prepared, 96%-pure magnesium hydride are placed in a laboratory ball mill and milled, and admixed with 250 ml of absolute tetrahydrofuran. Heating for two hours under reflux with continual milling leads to a conversion of 85%.

The reaction mixture is allowed to cool under a blanket of argon. As an alteration to the above-described work-up techniques, the metallic copper is allowed to settle in the ball mill, the supernatant liquid together with the milling media are decanted off and the raw product is washed free of salts in the reaction vessel. After drying, 9.5 g (84% of theory) of a pyrophoric, X-ray amorphous Cu powder are obtained.

Example 6

16.9 g (0.047 mol) of a 99.9%-pure tantalum(V) chloride and 3.4 g (0.118 mol) of a 91.8%-pure autocatalytically prepared magnesium hydride are placed in a 500 ml laboratory ball mill and milled, and admixed with 350 ml of toluene. After addition is complete, the mixture is, with further continual milling, quickly heated to the reflux temperature. Associated with the hydrogen evolution to be recorded, the accompanying color change is significant for following the progress of the reaction.

The reaction is complete after 8.5 hours and the mixture is cooled under a stream of argon. The reaction mixture is transferred to a P-5 glass frit and the ball mill is rinsed with small portions of toluene to avoid losses. The filter cake is first treated with ethanol, then filtration is repeated and the solid isolated is boiled for a number of hours with concentrated hydrochloric acid. Filtration and subsequent washing with water and ethanol followed by drying give a dark gray, X-ray amorphous tantalum powder.

Example 7

Using a method similar to Example 6, a reaction mixture comprising 16.6 g (0.042 mol) of 99.9%-pure tungsten(VI) chloride and 3.7 g (0.126 mol) of 90.5%-pure autocatalytically prepared magnesium hydride in 450 ml of toluene is reacted with continual milling at the reflux temperature. The reaction is complete after 8.5 hours and the mixture is cooled under a stream of argon and then transferred to a P-5 glass frit. Leaching and washing correspond to the steps described in Example 6.

After drying in an oil pump vacuum, a black, X-ray amorphous tungsten powder is obtained.

Example 8

2.3 g (0.29 mol) of lithium hydride and 15.6 g (0.096 mol) of anhydrous iron(III) chloride are placed in a laboratory ball mill and milled, and slowly admixed with cooled tetrahydrofuran, with a strong gas evolution being able to be recorded at this stage. After the reaction mixture has warmed to room temperature, it is allowed to react for about 20 minutes with further milling, and then quickly heated to the reflux temperature. The associated hydrogen evolution ensures that the progress of the reaction can be monitored. The reaction is complete after three hours and the mixture is cooled under a stream of argon. All the mixture is transferred into a two-neck flask which has been made inert, the metallic iron is separated off by means of a magnetic immersed finger and the remainder is discarded. Repeated washing of the raw product with THF and subsequent drying in an oil pump vacuum gives a nanocrystalline iron powder. Yield: 5.1 g (95% of theory).

Example 9

In a 500 ml laboratory ball mill, 1.9 g (0.242 mol) of lithium hydride and 16.0 g (0.04 mol) of tungsten(VI) chloride in 400 ml of toluene are heated with continual milling to the reflux temperature. The reaction is complete after 9 hours, the mixture is cooled under a stream of argon and filtered via a P-5 frit. Repeated washing of the filter cake with small portions of toluene, ethanol and argon-treated water frees the raw product of adhering foreign substances. Finally, the metal is washed further with ether and dried in an oil pump vacuum. 6.9 g (94% of theory) of a black X-ray amorphous tungsten powder is obtained.

We claim:

1. A process for preparing amorphous or nanocrystalline powder consisting of a single elemental metal selected from groups IB to VIIIB of the Periodic Table, said process comprising reacting a halide of said metal with autocatalytically obtained $MgH_2$, in an organic vehicle with continual milling.

2. A process according to claim 1 wherein said halide is selected from the group consisting of halides of groups IB, IVB and VIIIB of the Periodic Table.

* * * * *

UNITED STATES PATENT AND TRADEMARK OFFICE
CERTIFICATE OF CORRECTION

PATENT NO.   : 5,951,739
DATED        : September 14, 1999
INVENTOR(S)  : A. Klapdor et al.

It is certified that error appears in the above-identified patent and that said Letters Patent is hereby corrected as shown below:

<u>Title page,</u>
Item [57], ABSTRACT, "elemental metal" should read -- metal --

Signed and Sealed this

Eleventh Day of December, 2001

*Attest:*

*Attesting Officer*

NICHOLAS P. GODICI
*Acting Director of the United States Patent and Trademark Office*